March 27, 1962     F. BUDRECK     3,027,036
PERFORATED HARDBOARD SUPPORT FOR SCREW-CAP CONTAINERS
Filed May 27, 1960     2 Sheets-Sheet 1
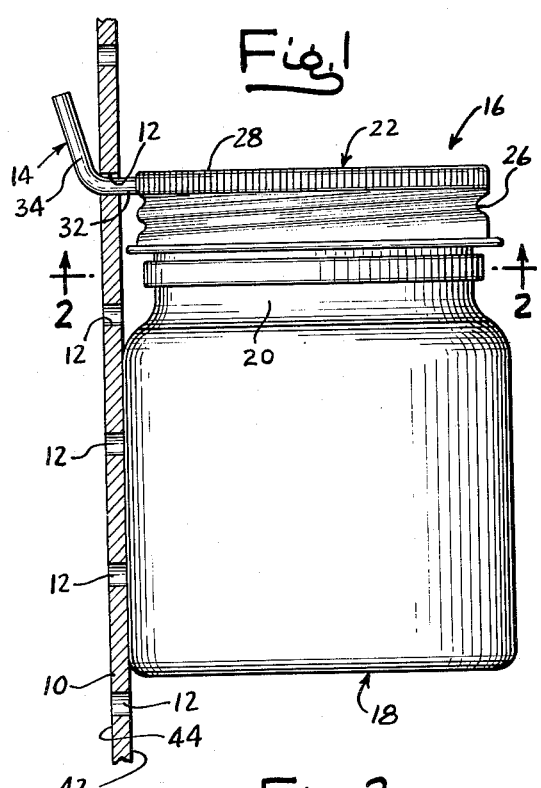
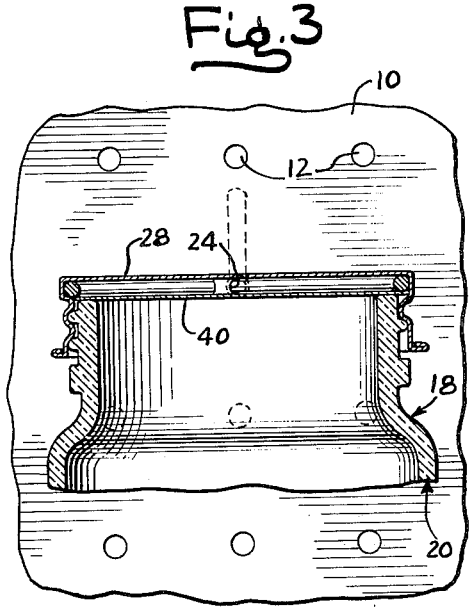
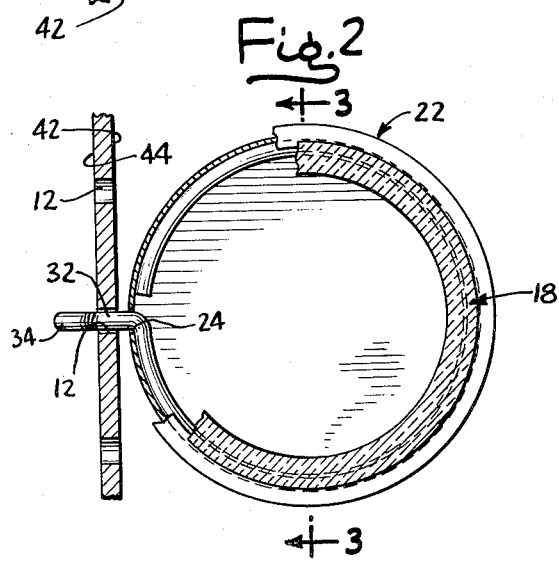
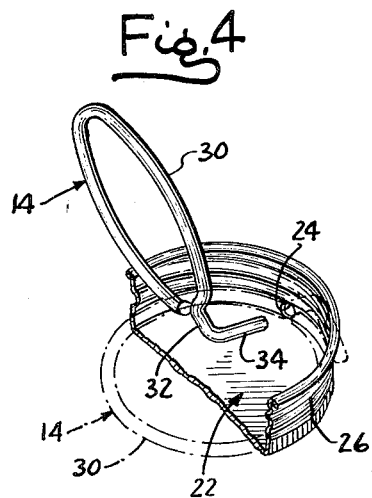
INVENTOR.
FRANCES BUDRECK
BY Norman Gerlach
ATTY.

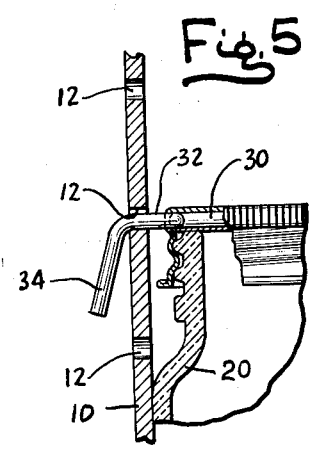
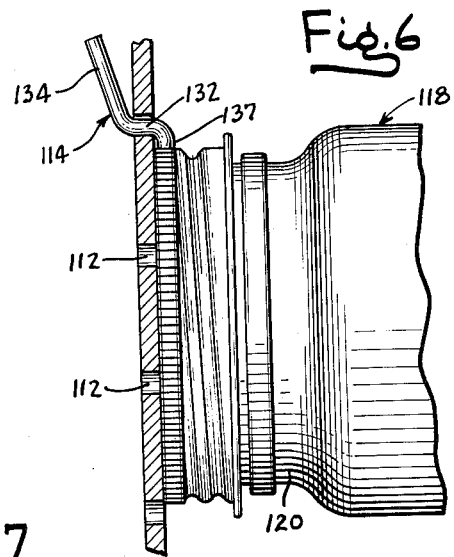
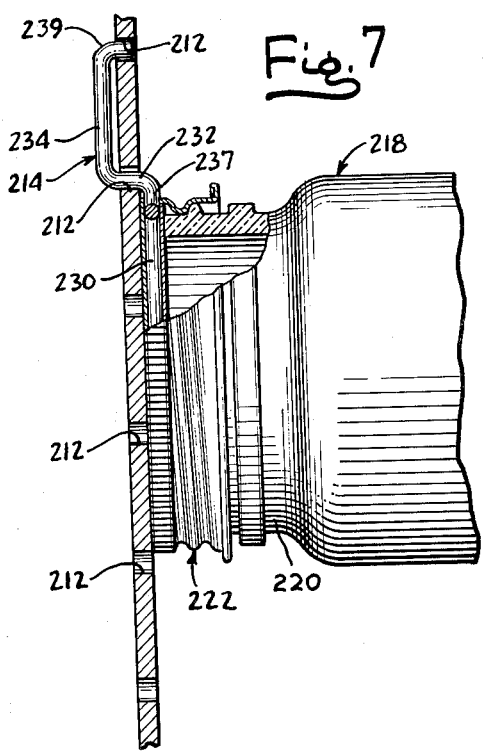
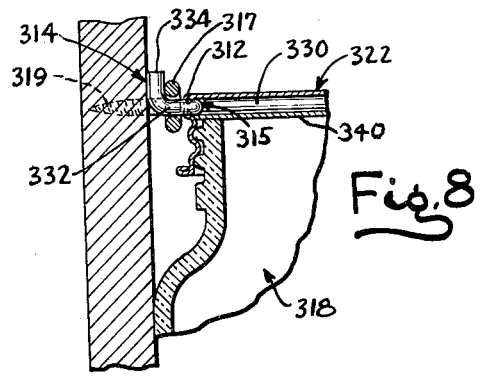
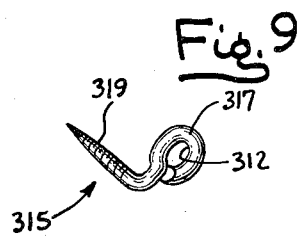

United States Patent Office 3,027,036
Patented Mar. 27, 1962

3,027,036
PERFORATED HARDBOARD SUPPORT FOR SCREW-CAP CONTAINERS
Frances Budreck, Chicago, Ill., assignor to Monarch Tool & Machinery Co., Chicago, Ill., a corporation of Illinois
Filed May 27, 1960, Ser. No. 32,481
5 Claims. (Cl. 215—100)

The present invention relates to hardware for perforated hardboard and has particular reference to a novel heavy gauge wire perforated hardboard support whereby a conventional glass or other screw cap container may removably be applied to perforated hardboard in various selected positions. The invention is applicable to existing screw cap containers such as are currently employed in the packaging and marketing of food products and which, for adaptation to the principles of the present invention require only such modification as may easily be performed within the skill of the average householder. The invention is also capable of being manufactured as original equipment.

The classified and temporary storage of small articles of hardware such as nuts and bolts of varying sizes, screws, washers, nails and the like in glass screw cap containers where they may readily be distinguished, each from the others, for selection and use has long been the practice of many workmen, both amateur and professional alike. Although some manufacturers supply such glass screw top containers with racks of varying designs and sizes for the storage of the containers, most users of such containers obtain the same by not discarding empty food product jars which come in convenient six and eight ounce sizes.

Present perforated hardboard adaptation of these screw cap jars is costly in that for adequate support and accessibility of the jars, rack or shelf-like supports requiring at least two wire pegs for attachment to the perforated hardboard are employed. Such supporting racks and shelves require soldering or welding of the component parts and thus the cost thereof is relatively high, the usual two peg shelf or rack requiring guard rails to prevent the jars from sliding from the support. Furthermore, such perforated hardboard supports necessitate two-hand manipulation of the containers to obtain access to the interiors thereof, one hand to grasp the body of the container and the other to unscrew the cap.

Heretofore, attempts have been made to apply a suitable perforated hardboard support to existing screw caps by welding or soldering. It has been found however that the localized application of heat for these purposes will invariably destroy any lithographed material previously applied to the cap and, furthermore, the heat treated area is greatly weakened so that the welded or soldered area of the cap is likely to pull away from the body of the cap when the support is employed for the application of torque or other stress to the cap.

The present invention is designed to overcome the above-noted limitations that are attendant upon the perforated hardboard storage of screw cap jars and other containers for visibility and access purposes as outlined above and, toward this end, it contemplates the provision of a novel perforated hardboard support which is constructed entirely of perforated hardboard wire stock; which, by only minor modification of a standard screw cap, is easily attachable to such cap for support purposes; which, when applied to the perforated hardboard with the screw cap attached thereto, will support the cap securely in a desired position of orientation and offer to the cap a high degree of anti-torque resistance so that the body of the jar or other container may be applied to and removed from the screw cap by a twisting operation utilizing but one hand; and which also will support the cap and jar on the perforated hardboard against axial tilting movement. Additionally, the novel perforated hardboard support of the present invention may be manufactured from a single length of perforated hardboard wire stock by conventional wire coiling methods and machines without requiring soldering or welding operations. Finally, perforated hardboard supports constructed in accordance with the principles of the present invention may, without requiring any modification whatsoever of the means whereby it is attached to the screw cap, be designed with insertable pegs of varying characteristics so that the jar or other container associated with the screw cap may be placed in different desired positions on the perforated hardboard.

The provision of a perforated hardboard support of the character briefly outlined above being among the principal objects of the invention, it is a further object to provide such a support which inherently is provided with means for attachment to the closure cap of a container for ultimate support of the container in a selected position of orientation on the perforated hardboard and which therefore requires no soldering, welding or other similar adhering operations for its attachment to the closure cap.

Another object is to provide a pegboard support for screw caps wherein, by the application of the support to the cap, the marginal regions of the cap are materially reinforced and strengthened.

A further object of the invention is to provide a perforated hardboard support of this character which, when the same is operatively installed upon a container closure cap, has a portion thereof extending into the confines of the cap, yet which makes provision for shielding or sealing such portion from contact with the contents of the container to which the cap may be applied, including any moisture which may accumulate within the container, thus protecting the support from the oxidizing effect of such moisture.

Other objects and advantages of the invention, will become more readily apparent as the nature of the invention is better understood.

In the accompanying two sheets of drawings forming a part of this specification, several illustrative embodiments of the invention have been shown.

In these drawings:
FIG. 1 is a side elevational view of a closed screw cap container assembly to which one form of the perforated hardboard support of the present invention has been applied and showing the support operatively applied to a perforated hardboard so as to maintain the longitudinal axis of the container in a vertical or upright position;

FIG. 2 is an enlarged sectional view taken substantially along the line 2—2 of FIG. 1 with certain parts being broken away to more clearly reveal the nature of the invention;

FIG. 3 is a sectional view taken substantially along the line 3—3 of FIG. 2;

FIG. 4 is a fragmentary perspective view, somewhat schematic in its representation illustrating the manner of assembly of the perforated hardboard support of FIG. 1 on a conventional screw cap;

FIG. 5 is a fragmentary side elevational view similar to FIG. 1 showing the perforated hardboard support of FIG. 1 installed in a reverse position on the screw cap;

FIG. 6 is a side elevational view similar to FIGS. 1 and 5 showing a modified perforated hardboard support together with its attached container installed on the perforated hardboard;

FIG. 7 is a side elevational view similar to FIGS. 1, 5 and 6 showing a further modified form of perforated hardboard support;

FIG. 8 is a sectional view taken substantially vertically and centrally through a screw cap container showing a further modified form of perforated hardboard support operatively applied thereto and showing the container and support operatively attached to a cooperating wall bracket; and FIG. 9 is a perspective view of the wall bracket of FIG. 8.

Referring now to the drawings in detail and in particular to FIGS. 1 to 4 inclusive, a section of commercial perforated hardboard stock, commonly referred to as "Pegboard," is shown at 10. The perforated hardboard is provided with the usual perforations or holes 12 therein, such holes being arranged in rows both vertically and horizontally. A perforated hardboard support constructed in accordance with the principles of the present invention has been designated in its entirety at 14 (see particularly FIG. 4) and this support is designed for the purpose of removably securing a container assembly such as the assembly 16 in position on the perforated hardboard 10.

The container assembly 16 may be in the form of a conventional glass jar 18 having a reduced externally threaded neck portion 20 adapted to receive thereover an internally threaded closure cap 22. The closure cap 22 is purely conventional in its design, except for the provision of a small hole 24 in the threaded skirt portion 26 of the cap and the nature and function of such hole will be set forth presently. The cap 22 is provided with a flat circular top wall or crown portion 28.

In order to support or suspend the container assembly 16 from the perforated hardboard 10, utilizing any selected hole 12 for such purpose, the perforated hardboard support 14 is adapted to be operatively and fixedly secured to the closure cap 22 in a manner that will now be described in detail.

The perforated hardboard support is in the form of a unitary length of perforated hardboard wire stock so shaped as to present a circular loop portion 30 and a hook including a proximate portion 32 in the form of an arm which extends radially outwardly from one end of the circular loop portion 30, and a distal portion 34 which extends at an obtuse angle to the base portion 12.

In order to attach the perforated hardboard support 14 to the container screw cap 22, it is necessary merely to drill or punch previously mentioned small hole 24 in the skirt portion 26 of the screw cap near the base thereof and insert the hook 32, 34, through the hole as illustrated schematically in FIG. 4. This may be done in several ways, a convenient way being first to insert the distal portion 34 through the hole 24 from the inside of the skirt portion 26, as indicated in full lines in FIG. 4, until the proximate portion 32 engages the skirt portion. Thereafter, the loop may be rotated 180° and pressed downwardly against the crown portion 28 so as to seat in the circular juncture between the skirt portion 26 and the crown portion 28 as shown in dotted lines in FIG. 4 and as also illustrated clearly in FIGS. 2 and 3.

Prior to the creation of the hole 24 in the skirt portion 26 of the closure cap 22, the usual wax paper or cardboard liner disk 40 is preferably, but not necessarily, removed from the closure cap and the installation of the perforated hardboard support made as described above. After the loop portion 30 has been pushed into coextensive line contact with the crown portion 28 of the closure cap, the liner disk 40 may be reinstalled so as to seat upon the loop portion 30 so that this loop portion is confined between the crown portion 28 and disk 40. In this position it is sealed from the atmosphere and from any moisture which may be present in the jar 18 to which the closure cap is applied. The efficiency of the liner disk 40 is not impaired since, when the threaded neck portion 18 of the jar is screwed into the skirt portion 26 of the closure cap 22, the liner disk will make coextensive contact with the rim portion of the jar.

After the support 14 has been operatively applied to a closure cap 22 in the manner indicated above, the closure cap may be suspended from the perforated hardboard 10 by merely inserting the distal and proximate portions 34 and 32 respectively through a selected hole 12 and releasing the assembly. If the jar 18 is previously applied to the closure cap 22, the stable equilibrium of the assembly will cause the jar to assume the vertical position shown in FIG. 1 under the influence of gravity. If the jar is not so applied, the closure cap may be moved to a horizontal position manually for subsequent application thereto of the jar 18. The side of the cylindrical jar 18 will make line contact with the outer face 42 of the perforated hardboard 10 while the intermediate portion 34 will extend at a slight angle to the remote face 44 of the perforated hardboard.

In FIG. 5 the perforated hardboard support 14 is shown as being reversed relative to the closure cap so that after the final installation the intermediate portion 34 of the hook will project downwardly instead of upwardly when the container 16 is in its erect vertical position. The installation of the support 14 on the closure cap 22 may be made as indicated in broken lines in FIG. 4 and as previously described except that the insertion is initially made when the position of the loop is reversed at 180°. Again, the liner disk 40 may be relocated as previously described. In the installation of FIG. 6, the position of the container 16 will be the same as in FIG. 1, but the distal portion 34 of the hook will extend downwardly alongside the face 44 of the perforated hardboard 10.

In a FIG. 6 a modified form of perforated hardboard support 114 has been disclosed. By means of the support 114 the assembled container and support may be applied to the perforated hardboard so that the axis of the jar 118 extends horizontally. The support 114 is similar to the previously described support 14 shown in FIG. 1 and the container 116 is identical with the container 16. Thus, to avoid needless repetition of description, similar reference numerals but of a higher order have been applied to the corresponding parts disclosed in FIGS. 1 and 5 respectively.

The portions 132 and 134 of the hook remain unaltered, but a short right angle section 137 is interposed between the portion 132 and the loop 130. Otherwise, the support 114 remains the same as the support 14.

In FIG. 7, another slightly modified form of container support 214 has been shown but its mode of application to the container closure cap 222 remains substantially the same as described in connection with the previously described forms of the invention. Again, to avoid needless repetition of description, similar reference numerals but of a higher order have been applied to the corresponding parts seen in FIGS. 1 and 7 respectively.

The hook 215 has portions 232 and 234 similar to the portions 147, 132 and 134 respectively of the form of the invention shown in FIG. 6, but the portion 234 is slightly longer than the portion 134 so that it spans the distance between adjacent vertically aligned holes 212. Additionally, it extends at a right angle to the portion 232. A terminal portion 239 is turned laterally outwardly so that it may enter the hole 212 in reentrant fashion immediately above the hole which receives the portion 232 when the support 214 is operatively applied to the perforated hardboard 210. By such an arrangement, an antitorque feature is obtained whereby when torque is applied to the closure cap 222 by turning of the jar 218 in one direction or the other to tighten or loosen the cap on the jar, this torque is effectively resisted.

In FIGS. 8 and 9 an additional form of the invention has been disclosed. The perforated hardboard support 314 is similar to the previously described supports 14, 114 and 214 but this latter support is adapted for use either in connection with a perforated hardboard or with the eyelet bracket 315 illustrated in detail in FIG. 9. This eyelet bracket 315 is in the form of a conventional wood penetrating eyelet but in which the loop portion 317 thereof extends at a right angle to the threaded shank 319. The bracket is adapted to be screwed into a wall 310 or similar supporting surface so that the loop 317 remains slightly spaced from the wall and extends parallel thereto. The central opening 332 provided by the loop portion 317 may then function in the manner of a hole for reception therethrough of the hook associated with the support 314.

The support 314 is similar to the support 14 in that it includes a proximate portion 332 and a distal portion 334 corresponding to the proximate and distal portions 32 and 34 respectively. However these two portions extend at right angles to each other. The loop portion 330 of the support 314 remains substantially the same as the loop portion 30.

In the application of the support 314 to the loop portion 317 of the bracket 315, it is merely necessary to insert the portion 334 of the hook through the opening 312 in the loop portion 317 and release the container assembly 316. The container will then swing to its vertical position as shown in FIG. 8 under the influence of gravity inasmuch as the center of gravity of the container assembly is well below the suspension point of the assembly.

The invention is not to be limited to the exact arrangement of parts shown and described in the accompanying drawings as various changes in the details of construction may be resorted to without departing from the spirit of the invention. For example, it is obvious that any of the forms of the invention described herein are capable of use with the eyelet bracket 315, as well as with conventional perforated hardboard. Only insofar as the invention has particularly been pointed out in the accompanying claims is the same to be limited.

Having thus described the invention what I claim as new and desire to secure by Letters Patent is:

1. The combination with a container closure cap having a crown portion and a threaded circumferential skirt portion designed for threaded reception on a container neck portion, there being a hole in said skirt portion adjacent the region of juncture between the skirt portion and the crown portion and at the base of the threads on the skirt portion, of a perforated hardboard support for the closure cap, said support comprising a length of wire stock having a split arcuate loop portion fitting against the inside face of the crown portion and engaging the skirt portion at points distributed circumferentially therearound over an arc of at least 270°, said split arcuate loop portion having one end thereof turned radially outwardly of the loop and providing a short radial arm, the outer end of said radial arm being turned upwardly and extending above the general plane of the crown portion of the closure cap, said radial arm and upwardly turned outer end thereof constituting a hook adapted to be projected through a hole in the perforated hardboard support for supporting the closure cap on the support.

2. The combination set forth in claim 1 wherein said loop is of substantially 360° extent and including, additionally, a circular liner disk bearing against said loop substantially coextensively therewith on the side of the loop remote from said crown portion.

3. The combination set forth in claim 1 wherein the outer end of said radial arm is turned upwardly at an obtuse angle with respect to the radial arm.

4. The combination with a container closure cap having a crown portion and a circumferential skirt portion designed for threaded reception on a container neck portion, there being a hole in said skirt portion adjacent the region of juncture between the skirt portion and the crown portion, of a perforated hardboard support for the closure cap, said support comprising a length of wire stock having a loop portion fitting against the inside face of the crown portion and engaging the skirt portion at points distributed circumferentially therearound over an arc of at least 180°, and a hook on said loop portion and including a radially extending arm projecting outwardly from said loop and extending through said hole, said hook including a distal arm on the outer end of said radially extending arm and extending at a right angle thereto.

5. The combination with a container closure cap having a crown portion and a circumferential skirt portion designed for threaded reception on a container neck portion, there being a hole in said skirt portion adjacent the region of juncture between the skirt portion and the crown portion, of a perforated hardboard support for the closure cap, said support comprising a length of wire stock having a loop portion fitting against the inside face of the crown portion and engaging the skirt portion at points distributed circumferentially therearound over an arc of at least 180°, and a hook on said loop portion and including a radially extending arm projecting outwardly from said loop and extending through said hole, said hook including a distal arm on the end of said radially extending arm and extending at a right angle thereto, said distal arm being formed with a laterally turned terminal portion extending in a reentrant direction relative to the base portion.

References Cited in the file of this patent

UNITED STATES PATENTS 635,769     Gordon  ---------------- Oct. 31, 1899

FOREIGN PATENTS 75,236     Denmark  -------------- Dec. 15, 1952